(12) United States Patent
Fujishiro

(10) Patent No.: US 10,904,799 B2
(45) Date of Patent: Jan. 26, 2021

(54) BASE STATION AND METHOD USED IN A BASE STATION

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/199,133

(22) Filed: Nov. 24, 2018

(65) Prior Publication Data

US 2019/0098535 A1    Mar. 28, 2019

Related U.S. Application Data

(63) Continuation of application No. PCT/JP2017/018621, filed on May 18, 2017.

(30) Foreign Application Priority Data

May 26, 2016    (JP) ................................ 2016-105167

(51) Int. Cl.
*H04W 28/24*    (2009.01)
*H04W 88/08*    (2009.01)
*H04W 24/02*    (2009.01)
*H04W 28/18*    (2009.01)
*H04W 76/27*    (2018.01)
(Continued)

(52) U.S. Cl.
CPC ........... *H04W 28/24* (2013.01); *H04W 24/02* (2013.01); *H04W 28/0236* (2013.01); *H04W 28/0257* (2013.01); *H04W 28/0263* (2013.01); *H04W 28/18* (2013.01); *H04W 48/18* (2013.01);
(Continued)

(58) Field of Classification Search
CPC ..... H04W 28/24; H04W 28/18; H04W 24/02; H04W 88/08; H04W 48/18; H04W 28/0263; H04W 28/0257; H04W 28/0236; H04W 76/27; H04W 80/02
See application file for complete search history.

(56) References Cited

U.S. PATENT DOCUMENTS 7,860,798 B2 *   12/2010   Rubinstein ......... H04N 7/17336
                                                705/51
2006/0002333 A1 *   1/2006   Skog ..................... H04L 47/805
                                                370/328
(Continued)

FOREIGN PATENT DOCUMENTS

EP           3229524 A1 *   10/2017   ............ H04W 28/26
WO     2017/204067 A1    11/2017

OTHER PUBLICATIONS

Huawei, Hisilicon, Network Slicing considerations, 3GPP TSG-RAN WG2 Meeting #93bis, R2-162664, Apr. 11-15, 2016, pp. 1-3, Dubrovnik, Croatia.

(Continued)

*Primary Examiner* — Tejis Daya
(74) *Attorney, Agent, or Firm* — Studebaker & Brackett PC

(57) ABSTRACT

A network apparatus according to an embodiment is provided in a radio access network including a plurality of core network slices. The network apparatus includes a controller configured to manage a resource allocated to a radio terminal for each core network slice, based on a quality of service requirement of each of the plurality of core network slices. The controller provides a control signal related with the resource to the radio terminal.

4 Claims, 6 Drawing Sheets

(51) Int. Cl.
  *H04W 28/02* (2009.01)
  *H04W 48/18* (2009.01)
  *H04W 80/02* (2009.01)
(52) U.S. Cl.
  CPC .......... *H04W 76/27* (2018.02); *H04W 88/08* (2013.01); *H04W 80/02* (2013.01)

(56) References Cited

U.S. PATENT DOCUMENTS

| | | | |
|---|---|---|---|
| 2009/0238207 A1* | 9/2009 | Zhao | H04W 28/22 370/468 |
| 2015/0063104 A1* | 3/2015 | Zhu | H04W 52/0206 370/230 |
| 2016/0112335 A1 | 4/2016 | Bouanen et al. | |
| 2016/0359682 A1* | 12/2016 | Senarath | H04L 41/0896 |
| 2017/0079059 A1* | 3/2017 | Li | H04W 16/02 |
| 2017/0085493 A1* | 3/2017 | Senarath | H04L 47/522 |
| 2017/0331577 A1* | 11/2017 | Parkvall | H04J 11/0079 |
| 2017/0332295 A1* | 11/2017 | Sunay | H04W 36/08 |
| 2018/0062800 A1* | 3/2018 | Chandramouli | H04W 76/11 |
| 2018/0368140 A1* | 12/2018 | Centonza | H04W 72/0426 |
| 2019/0098535 A1 | 3/2019 | Fujishiro | |
| 2019/0159027 A1* | 5/2019 | Kuge | H04W 60/00 |
| 2019/0182737 A1* | 6/2019 | Futaki | H04W 36/36 |

OTHER PUBLICATIONS

Huawei, "Key principles for Support of Network Slicing in RAN", RAN WG3 Meeting #92, R3-161133, May 23-27, 2016, 7 pages, Nanjing, China.

Huawei, Hisilicon, "UE Slice Association/Overload control Procedure", 3GPP TSG SA WG2 Meeting #115, S2-162605, May 23-27, 2016, 9 pages, Nanjing, China.

Nokia, Alcatel-Lucent Shanghai Bell, "Aligning reference point labels for the architecture", SA WG2 Meeting #115, S2-162537, May 23-27, 2016, 16 pages, Nanjing, P.R. China.

ZTE, "Clarification on Network Slicing in RAN", 3GPP TSG RAN WG3 Meeting #92, R3-161106, May 23-27, 2016, 5 pages, Nanjing, China.

Qualcomm Incorporated, "QoS principles for slicing in RAN", 3GPP TSG-RAN WG2 Meeting #95, R2-165699, Aug. 22-26, 2016, 3 pages, Gothenburg, Sweden.

* cited by examiner

FIG. 5

| CN SLICE ID | SERVICE QUALITY REQUIREMENT | FUNCTION (GROUP) | RESOURCE INFORMATION |
|---|---|---|---|
| #1 | QCI X | eDRX . . . | BEARER ID... RADIO RESOURCE ID... RRC ENTITY ID... |
| #2 | | | |

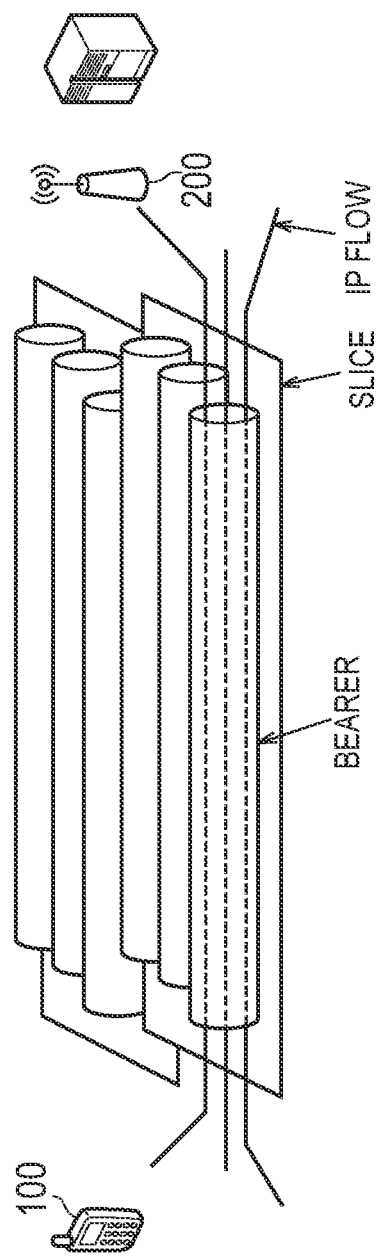

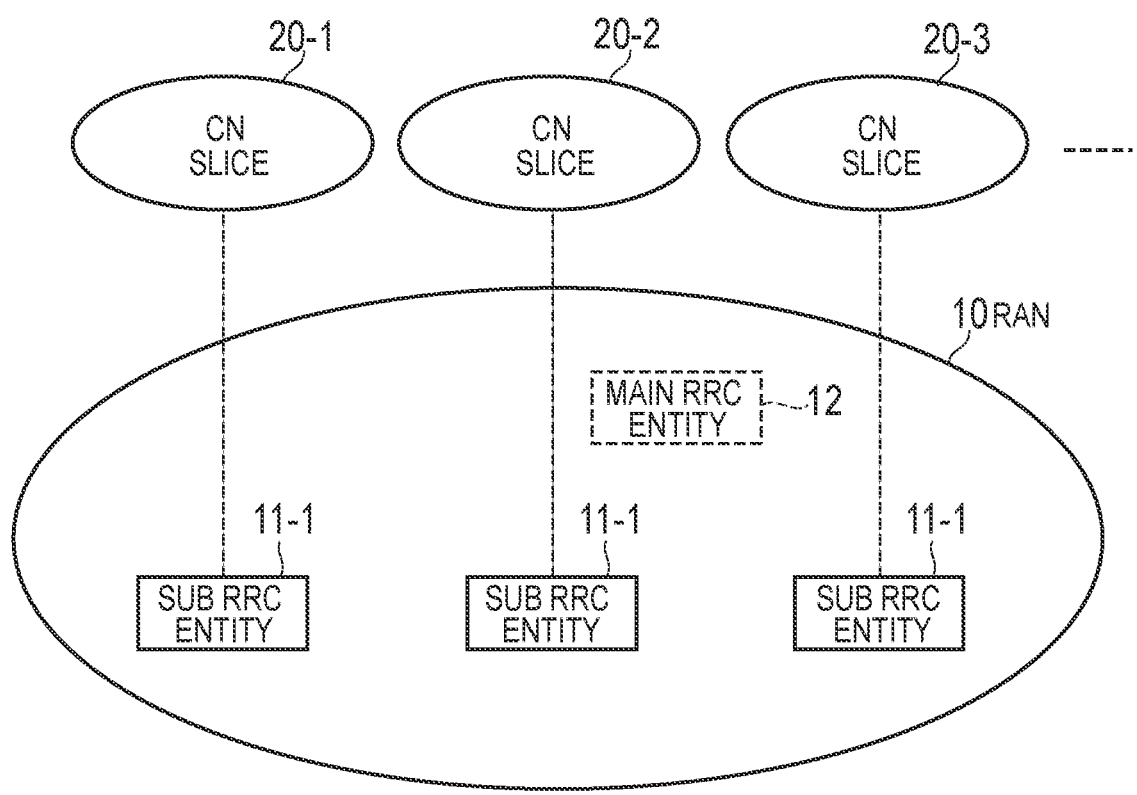

BASE STATION AND METHOD USED IN A BASE STATION

CROSS-REFERENCE TO RELATED APPLICATION

The present application is a continuation based on PCT Application No. PCT/JP2017/018621 filed on May 18, 2017, which claims the benefit of Japanese Patent Application No. 2016-105167 (filed on May 26, 2016). The content of which is incorporated by reference herein in their entirety.

FIELD

The present disclosure relates to a network apparatus used in a mobile communication system.

BACKGROUND

In recent years, in 3GPP (Third Generation Partnership Project) which is a standardization project of a mobile communication system, there is ongoing research on a technology for the 5th generation (5G) mobile communication system. It is assumed that the 5G system supports a new service and a new use case.

In order for a core network to support various services/use cases, a technology has been proposed in which the core network is divided into a plurality of core network slices to realize different services/use cases different depending on each core network slice (for example, see non Patent Document 1). Such a technology is called "network slicing". Here, one core network slice is comprised of a set of logical network functions. A plurality of core network slices share one radio access network.

However, if the "Network slicing" is introduced, a role to be played by the radio access network is unclear.

PRIOR ART DOCUMENT

Non-Patent Document

Non Patent Document 1: 3GPP contribution "R2-162664"

SUMMARY

A network apparatus according to an embodiment is provided in a radio access network shared by a plurality of core network slices. The network apparatus includes a controller configured to manage a resource allocated to a radio terminal for each core network slice, based on a quality of service requirement and/or a function of each of the plurality of core network slices. The controller provides a control signal related with the resource to the radio terminal.

BRIEF DESCRIPTION OF THE DRAWINGS

FIG. 5 is a table illustrating information managed by a base station.

FIG. 6 is a diagram illustrating a configuration of a U plane (User Plane).

FIG. 7 is a diagram illustrating a configuration of a C plane (Control Plane).

DESCRIPTION OF THE EMBODIMENT

A configuration of a mobile communication system according to an embodiment will be described, below. The mobile communication system according to the embodiment is a 5G mobile communication system based on 3GPP standards.

Figure 1:
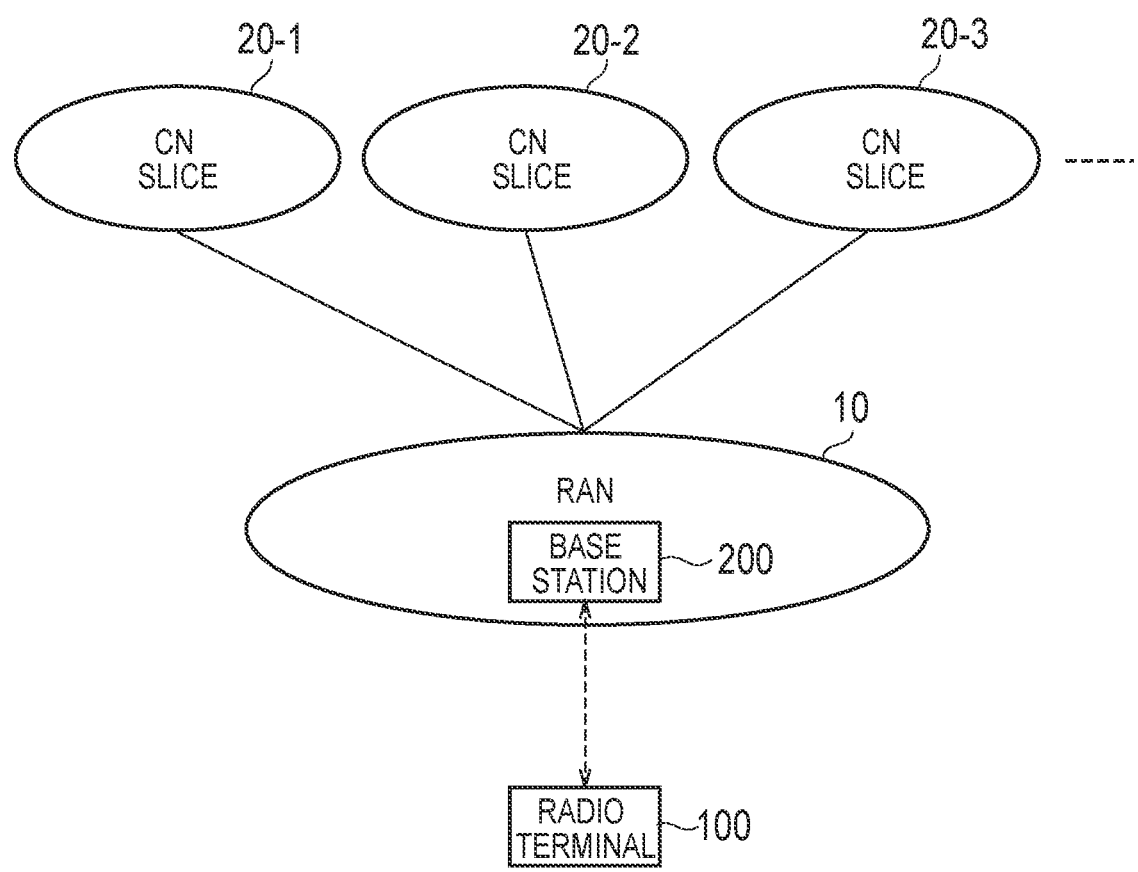
FIG. 1 is a diagram illustrating a configuration of a mobile communication system.

FIG. 1 is a diagram illustrating the configuration of the mobile communication system according to the embodiment. As illustrated in FIG. 1, the mobile communication system according to the embodiment includes a radio access network (RAN) 10, a plurality of core network (CN) slices 20, and a radio terminal 100. The radio terminal 100 may be referred to as "UE (User Equipment)". The RAN 10 and the plurality of CN slices 20 configure a network of the 5G mobile communication system.

The RAN 10 includes a base station 200 configured to perform radio communication with the radio terminal 100. The RAN 10 may include a device other than the base station 200. In the embodiment, the base station 200 corresponds to a network apparatus provided in the radio access network.

The base station 200 manages one or a plurality of cells, and performs radio communication with the radio terminal 100 having established a connection with a cell of the base station 200. The base station 200 has a radio resource management (RRM) function, a routing function of user data (hereinafter, simply called "data"), a measurement control function for mobility control and scheduling, and the like. The "cell" is used as a term indicating the smallest unit of a radio communication area. The "cell" is also used as a term indicating a function of performing radio communication with the radio terminal 100.

The plurality of CN slices 20 configure a core network configured to provide a service to the radio terminal 100 via the RAN 10. The plurality of CN slices 20 provide a different service/use case. Such a service/use case includes, for example, eMBB (enhanced Mobile Broadband, mMTC (massive Machine Type Communication), URLLC (Ultra Reliable and Low Latency Communications), and the like. In an example of FIG. 1, a CN slice 20-1 may provide the eMBB, a CN slice 20-2 may provide the mMTC, and a CN slice 20-3 may provide the URLLC. Thus, by providing various services/use cases by using the CN slice 20 different depending on each service/use case, complication of the core network can be avoided and an efficient network can be configured.

The plurality of CN slices 20 share the RAN 10. In other words, the RAN 10 provides each CN slice 20 with a virtual resource reserved for each CN slice 20. Each CN slice 20 is comprised of a set of logical network functions. A device configured to select and route the CN slice 20 may be provided between the RAN 10 and the plurality of CN slices 20.

The radio terminal 100 is a mobile-type terminal. The radio terminal 100 performs radio communication with a cell (serving cell) of the RAN 10. The radio terminal 100 is allocated with a resource from the RAN 10 and communicates with at least one CN slice 20 via the RAN 10. The radio terminal 100 may simultaneously communicate with the plurality of CN slices 20.

Figure 2:
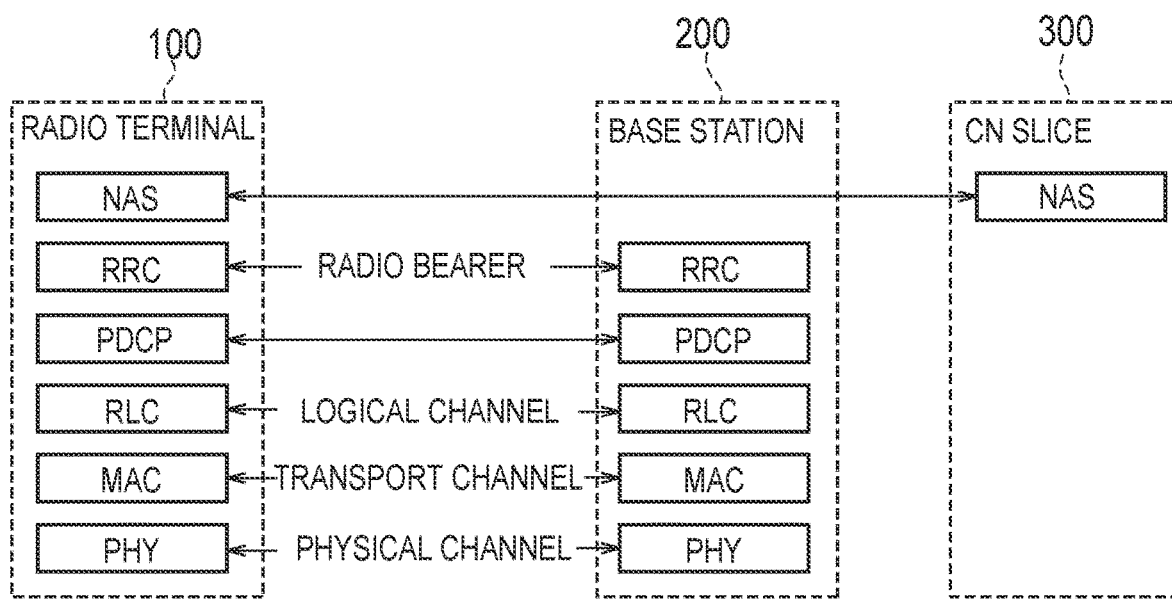
FIG. 2 is a diagram illustrating a protocol stack of a radio interface.

FIG. 2 is a diagram illustrating a protocol stack of a radio interface. Here, mainly the protocol stack of 3GPP LTE (Long Term Evolution) will be explained. As illustrated in FIG. 2, a radio interface protocol is partitioned into a first layer to a third layer of an OSI reference model, and the first layer is a physical (PHY) layer. The second layer includes an MAC (Medium Access Control) layer, a RLC (Radio Link Control) layer and a PDCP (Packet Data Convergence Protocol) layer. The third layer includes a RRC (Radio Resource Control) layer.

In the physical layer, encoding, decoding, modulation, demodulation, antenna mapping, antenna demapping, resource mapping and resource demapping are performed. Data and control signals are transmitted between the physical layer of each radio terminal 100 and the physical layer of each base station 200 via a physical channel.

In the MAC layer, data prioritization control, a retransmission process according to hybrid ARQ (HARQ), and a random access procedure are performed. Data and control signals are transmitted between the MAC layer of each radio terminal 100 and the MAC layer of each base station 200 via a transport channel. The MAC layer of each base station 200 includes a scheduler. The scheduler determines a transport format (a transport block size and a modulating/encoding method (MCS)) in uplink and downlink, and allocated resource blocks for each radio terminal 100.

In the RLC layer, data is transmitted to the RLC layer at a reception side by using functions of the MAC layer and the physical layer. Data and control signals are transmitted between the RLC layer of each radio terminal 100 and the RLC layer of each base station 200 via a logical channel.

In the PDCP layer, header compression, header extension, encryption and decoding are performed.

The RRC layer is defined only in a control plane which handles a control signal. Signaling (RRC signaling) for various configurations is transmitted between the RRC layer of each radio terminal 100 and the RRC layer of each base station 200. In the RRC layer, a logical channel, a transport channel and a physical channel are controlled in response to establishment, reestablishment and release of a radio bearer. When the RRC of each radio terminal 100 and the RRC of each base station 200 are connected (RRC connection), each radio terminal 100 is in a RRC connected mode and, when this is not a case, each radio terminal 100 is in a RRC idle mode.

An NAS layer located above the RRC layer performs session management, mobility management, and the like.

Figure 3:
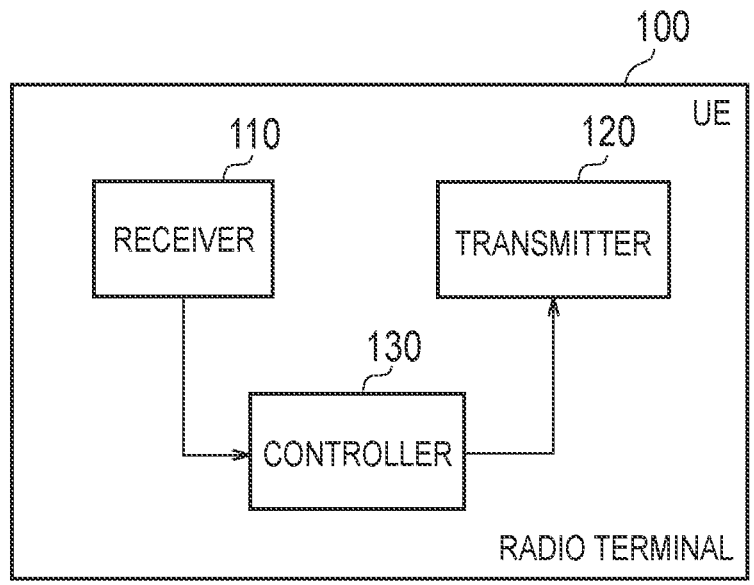
FIG. 3 is a diagram illustrating a configuration of a radio terminal.

FIG. 3 is a diagram illustrating a configuration of the radio terminal 100. As illustrated in FIG. 3, the radio terminal 100 includes a receiver 110, a transmitter 120, and a controller 130.

The receiver 110 performs various types of reception under control of the controller 130. The receiver 110 includes an antenna and a receiver. Further, the receiver converts a radio signal received at the antenna into a baseband signal (received signal) to output to the controller 130.

The transmitter 120 performs various types of transmission under control of the controller 130. The transmitter 120 includes an antenna and a transmitter. The transmitter converts a baseband signal (transmission signal) outputted from the controller 130 into a radio signal to transmit from the antenna.

The controller 130 performs various types of control in the radio terminal 100. The controller 130 includes a processor and a memory. The memory stores programs executed by the processor and information used for a process performed by the processor. The processor includes a baseband processor and a CPU (Central Processing Unit). The baseband processor modules, demodulates, encodes and decodes baseband signals. The CPU executes the programs stored in the memory to execute various types of processes. The processor may further include a codec which encodes and decodes audio and video signals. The processor executes the above-described various processes and various processes described later.

Figure 4:
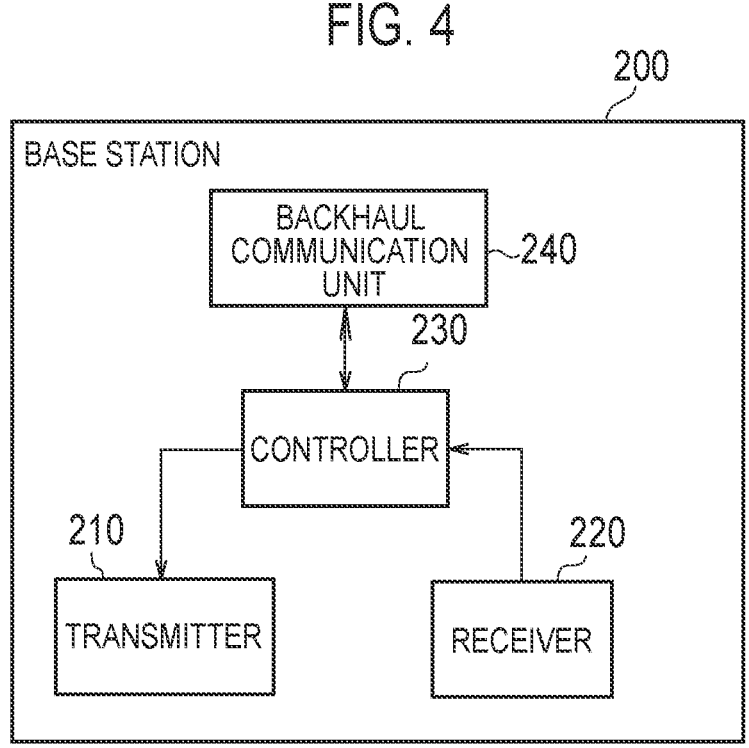
FIG. 4 is a diagram illustrating a configuration of a radio base station.

FIG. 4 is a diagram illustrating a configuration of a radio base station 200. As illustrated in FIG. 4, the base station 200 includes a transmitter 210, a receiver 220, a controller 230, and a backhaul communication unit 240.

The transmitter 210 performs various types of transmission under control of the controller 230. The transmitter 210 includes an antenna and a transmitter. The transmitter converts a baseband signal (transmission signal) outputted from the controller 230 into a radio signal to transmit from the antenna.

The receiver 220 performs various types of reception under control of the controller 230. The receiver 220 includes an antenna and a receiver. The receiver converts a radio signal received at the antenna into a baseband signal (received signal) to output to the controller 230.

The controller 230 performs various types of control in the base station 200. The controller 230 includes a processor and a memory. The memory stores programs executed by the processor and information used for a process performed by the processor. The processor includes a baseband processor and a CPU. The baseband processor modules, demodulates, encodes and decodes baseband signals. The CPU executes the programs stored in the memory to execute various types of processes. The processor executes the above-described various processes and various processes described later.

The backhaul communication unit 240 is connected to the plurality of CN slices 20 via a network interface. The backhaul communication unit 240 is used for communication with the CN slice 20. The backhaul communication unit 240 may be connected to a neighboring base station via a network interface.

Some functions of the controller 230, the transmitter 210, and the receiver 220 may be arranged in a different unit, and in this case, the unit and the base station 200 are connected by front-haul communication.

In the embodiment, the base station 200 is provided in the RAN 10 shared by the plurality of CN slices 20. The base station 200 (controller 230) manages a resource allocated to the radio terminal 100 for each CN slice 20, based on the respective quality of service requirements and/or functions of the plurality of CN slices 20.

FIG. 5 is a table illustrating information managed by the base station 200 (the controller 230). At least a part of the information illustrated in FIG. 5 may be provided from the CN slice 20 to the base station 200. As illustrated in FIG. 5, an identifier (CN slice ID), a quality of service requirement, a function (group), and a resource are allocated for each CN slice 20.

The quality of service requirement includes a quality of service (QoS) required for the corresponding CN slice 20. The quality of service requirement may be QoS required for the service/use case provided by the CN slice 20. The QoS includes a delay, a throughput, a reliability, etc. The quality of service requirement may be identified by QCI (QoS: Class Identifier) being an index value of the QoS. The quality of service requirement may include a use case corresponding to the CN slice 20.

The function (group) is a function (group) required for the corresponding CN slice 20. This function is a function required for the service/use case provided by the CN slice 20. For example, the function includes eDRX (extended Discontinues Reception), MBMS (Multimedia Broadcast Multicast Service), D2D (Device to Device), and the like. A function essential for each CN slice 20 may be defined in advance. If the function essential for each CN slice 20 is defined in advance, the radio terminal 100 may notify the RAN 10 (base station 200) of which CN slice to support, as Capability. The base station 200 may set the corresponding function to the radio terminal 100 by using an ID of the required CN slice 20.

The resource is a resource allocated by the RAN 10 to the radio terminal 100 and includes any one of the following 1) to 3).

1) Radio resource defined by time and/or frequency. The time-frequency resource is a time-frequency resource (group) that can be used when the radio terminal 100 uses the service/use case. The time-frequency resource may be identified by ID of a radio resource pool, ID of a frequency carrier (component carrier), and the like.

2) Bearer composed of plurality of IP (Internet Protocol) flows. The bearer may be a logical communication path established between the radio terminal 100 and the CN slice 20 via the RAN 10. The bearer carries data of the radio terminal 100. The bearer may be identified by a bearer ID.

3) Control entity configured to control communication with radio terminal 100. A control entity is an entity of the C plane, for example, an RRC entity. The RRC entity provides RRC signaling to the radio terminal 100. The RRC entity may be identified by an RRC entity ID.

The base station 200 (controller 230) provides the radio terminal 100 with a control signal (signaling) related with a resource managed for each CN slice 20. The control signal may be the control signal dedicated to each radio terminal (Dedicated Signaling). The control signal may be a control signal (Broadcast Signaling) common to a plurality of radio terminals. The radio terminal 100 performs radio communication with the base station 200, based on a control signal provided from the base station 200.

Firstly, the base station 200 provides the control signal accompanying the quality of service requirement (QoS) for each CN slice 20. For example, the base station 200 provides the radio terminal 100 with the CN slice ID and information indicating the QCI and/or the use case corresponding to the CN slice ID.

Secondly, the base station 200 provides the control signal accompanying the function for each CN slice 20. For example, the base station 200 provides the radio terminal 100 with the CN slice ID and eDRX H-SFN (Hyper System Frame Number), a resource pool ID, a component carrier ID, and the like corresponding to the CN slice ID.

Alternatively, the base station 200 may not directly provide the radio terminal 100 with the CN slice ID, but may provide the radio terminal 100 with a bearer ID/RRC entity ID corresponding to the CN slice ID, instead of the CN slice ID. The base station 200 may provide the radio terminal 100 with information indicating a corresponding relationship between the CN slice ID and the bearer ID/RRC entity ID.

A common control signal (Broadcast Signaling) may be composed of a plurality of pieces of broadcast information, the corresponding CN slice IDs may be associated with the plurality of pieces of broadcast information, and the CN slice ID, together with the corresponding broadcast information, may be notified. For example, radio configuration information and access regulation information specific to the CN slice are associated with the corresponding CN slice IDs, respectively. Specifically, the base station 200 transmits broadcast information 1 for the CN slice 20-1, broadcast information 2 for the CN slice 20-2, broadcast information 3 for the CN slice 20-3, . . . to the radio terminal 100. As a result, the radio terminal 100 can set the broadcast information corresponding to the required CN slice to the radio terminal 100 itself.

Next, a configuration of the U plane (User Plane) according to the embodiment will be described. FIG. 6 is a diagram illustrating a configuration of the U plane according to the embodiment.

As illustrated in FIG. 6, the base station 200 associates a plurality of bearers with one CN slice 20 and associates a plurality of IP flows with one bearer. In other words, the base station 200 groups the plurality of IP flows into one bearer and groups the plurality of bearers into one CN slice 20. The base station 200 may perform a QoS control for each IP flow and a QoS control for each bearer. The base station 200 may set mapping information indicating a corresponding relationship among the IP flow, the bearer, and the CN slice, to the radio terminal 100. The base station 200 may provide the radio terminal 100 with a PDCP setting, a RLC setting, and a logical channel (LC) ID, for each IP flow or each bearer.

The base station 200 performs a QoS parameter setting (QoS setting) for each bearer, on the radio terminal 100. That is, the base station 200 performs the QoS setting in bearer units in which a plurality of IP flows are bundled. For example, the base station 200 transmits a control signal including the QoS setting for each bearer, to the radio terminal 100. The QoS setting may be an LCP (Logical Channel Prioritization) parameter. The base station 200 may simultaneously set a function (eDRX or the like) required for each CN slice 20.

When the IP flow-based QoS and the bundled QoS (bearer-based QoS) are set, the radio terminal 100 (and the base station 200) may recognize that at least the bundled QoS is guaranteed. Alternatively, the IP flow-based QoS may be given priority over the bearer base-d QoS. If a plurality of IP flow-based QoSs are set, the radio terminal 100 (and the base station 200) may use the IP flow-based QoS with the highest bit rate, as a representative QoS setting, out of the plurality of IP flows, and perform a control so that at least the representative QoS setting is satisfied.

Next, s configuration of the C plane (Control Plane) according to the embodiment will be described. FIG. 7 is a diagram illustrating the configuration of the C plane according to the embodiment.

As illustrated in FIG. 7, the RAN 10 (base station 200) includes a sub RRC entity 11 reserved for each CN slice 20. The RAN 10 may further include a main RRC entity 12 positioned higher than the plurality of sub RRC entities 11. The main RRC entity 12 manages a plurality of sub RRC entities 11.

A priority may be assigned to each RRC entity (plurality of sub RRC entities 11 and the main RRC entity 12). For example, the RAN 10 (base station 200) may be able to perform an interruption process on an RRC entity with a lower priority, if performing signaling from the RRC entity with a higher priority to the radio terminal 100. An inactive duration/active duration may be provided for each RRC entity. The RRC entity suspends an operation during the inactive duration.

The main RRC entity 12 performs a overall setting for all the sub RRC entities 11. Each sub RRC entity 11 performs a setting of a function corresponding to the CN slice 20 and/or an individual setting related with the bearer/IP flow corresponding to the CN slice 20.

The main RRC entity 12 performs at least one of the following settings as a setting of the main RRC entity 12 itself (setting of the entire cell). The main RRC entity 12 may transmit at least one signaling (Dedicated Signaling or Broadcast Signaling) out of the following settings, to the radio terminal 100.

System setting (bandwidth, SFN, cell ID, tracking area code or the like)
Related with measurement report
Related with cell reselection (serving cell, adjacent cell, different RAT)
Related with access control
Paging setting
Setting of child RRC (sub RRC entity 11)
ID of child RRC (sub RRC entity 11)
PLMN ID
CN slice ID
Priority (processing priority)
Function (function to be handled by each sub RRC entity 11)
IP flow ID/bearer ID (U plane to be handled by each sub RRC entity 11)
Radio resource (radio resource to be handled by each sub RRC entity 11 or radio resource for signaling)

Each sub RRC entity 11 performs at least one of the following settings. The main RRC entity 12 may transmit at least one signaling (Dedicated Signaling or Broadcast Signaling) out of the following settings, to the radio terminal 100. However, at least one of the following settings may be performed by the main RRC entity 12.

Setting for each function (for example, D2D, MBMS or the like)
Setting for each IP flow/bearer (PDCP, RLC)
MAC setting (LCP, DRX or the like)

As described above, according to the embodiment-based base station 200, an appropriate QoS control can be performed for each CN slice 20, and the service quality of each CN slice 20 can be guaranteed.

In the above embodiment, an example in which the network apparatus according to the present disclosure is the base station 200 has been described. However, the network apparatus according to the present disclosure may be a network apparatus (for example, a base station control device) different from the base station 200.

INDUSTRIAL APPLICABILITY

The present disclosure is useful in the field of mobile communication.

The invention claimed is:

1. A base station provided in a network including a plurality of network slices, the base station comprising:
a controller configured to:
receive, from a core network apparatus, a message including
identification information of each of the network slices,
information indicating a quality of service (QoS) requirement of a traffic flow belonging to each of the network slices, and
identification information of radio bearers associated with the traffic flow, each respective network slice being associated with a plurality of radio bearers;
configure the radio bearers allocated to a user equipment for each network slice, based on the message; and
provide a control signal related with the radio bearers, to the user equipment.

2. The network apparatus according to claim 1, wherein the control signal includes information indicating the QoS requirement.

3. The network apparatus according to claim 1, wherein the control signal includes a QoS parameter to be applied to the radio bearers.

4. A method used in a base station provided in a network including a plurality of network slices, the method comprising:
receiving, from a core network apparatus, a message including
identification information of each of the network slices,
information indicating a quality of service (QoS) requirement of a traffic flow belonging to each of the network slices, and
identification information of radio bearers associated with the traffic flow, each respective network slice being associated with a plurality of radio bearers;
configuring the radio bearers allocated to a user equipment for each network slice, based on the message; and
providing a control signal related with the radio bearers, to the user equipment.

* * * * *